United States Patent [19]

Morgan

[11] Patent Number: 4,457,213
[45] Date of Patent: Jul. 3, 1984

[54] BELLOWS STRUCTURE AND METHOD

[75] Inventor: David L. Morgan, Stratford, Conn.

[73] Assignee: Seymour-Sheridan, Inc., Stratford, Conn.

[21] Appl. No.: 427,603

[22] Filed: Sep. 29, 1982

[51] Int. Cl.³ .......................... F01B 19/02; F16J 3/04
[52] U.S. Cl. ......................................... 92/42; 92/45; 29/454; 228/182
[58] Field of Search ............... 92/42, 45; 29/156.4 R, 29/454; 228/182, 189

[56] References Cited

U.S. PATENT DOCUMENTS

| | | | |
|---|---|---|---|
| 1,180,947 | 4/1916 | Scott | 92/45 |
| 1,341,669 | 6/1920 | Porter | 92/45 |
| 1,367,792 | 2/1921 | Arbuckle | 92/45 |
| 1,717,196 | 6/1929 | Emmet | 29/454 |
| 2,534,123 | 12/1950 | Hasselhorn | 92/45 |
| 2,920,656 | 1/1960 | Bertolet | 92/42 |
| 3,162,213 | 12/1964 | Peters | 92/42 |
| 3,394,631 | 7/1968 | Thompson | 92/46 |

Primary Examiner—Robert E. Garrett
Assistant Examiner—Scott L. Moritz
Attorney, Agent, or Firm—Thomas L. Tully

[57] ABSTRACT

Flexible welded metal bellows comprising a plurality of diaphragms comprising flexible metal annuli free plates or rings having similar inner and outer diameters, alternate pairs of said plates having their outer and inner peripheries, respectively, welded to each other to form a fluid-tight connection therebetween. The invention comprises interposing and welding a metal annuli spacer plate or ring between at least one adjacent pair of said flexible free plates to space the free plates from each other and to prevent or reduce the pressure contact between the adjacent welds when the bellows is retracted. The spacer plate(s) or ring(s) interposed between the pairs of free plates which are welded at their outer peripheries have the same outer diameter as said free plates and are welded therebetween and have a larger inner diameter than said free plates; the spacer plate(s) or ring(s) interposed between the alternate pairs of free plates which are welded at their inner peripheries have the same inner diameter as said free plates and are welded therebetween and have a smaller outer diameter than said free plates.

5 Claims, 2 Drawing Figures

BELLOWS STRUCTURE AND METHOD

BACKGROUND OF THE INVENTION

The present invention relates to improved axially-flexible metal bellows for use in heat-sensitive and/or pressure-sensitive devices, such as valves. Conventional metal bellows devices are formed by superposing or stacking a pile of similar flexible diaphragms comprising metal annuli free plates or rings and welding or soldering the inner and outer peripheries of alternate free plates or rings to each other to form fluid-tight welds. The top and bottom free plates are soldered or welded to fittings of a valve or other device to form a closed, fluid-tight interior compartment and/or a closed fluid-tight exterior compartment, the latter being formed between the outside of the bellows and a sealed casing of the valve or other device. Pressure variations between the interior and the exterior of the bellows cause axial expansion or contraction of the accordion-like bellows, which movement is adapted to activate a component, such as cause a valve member to close or open, as desired, to relieve the conditions giving rise to the excess pressure or temperature conditions.

Reference is made to U.S. Pat. Nos. 3,394,631 and 3,503,770 for their disclosure of bellows devices and the problems involved therewith.

The bellows devices of the present invention are of the type formed by welding together a plurality of superposed or stacked flexible metal annuli or rings, the inner and outer peripheries of alternate adjacent annuli or rings being welded or soldered together to form an accordion-like, axially-flexible bellows in which the joined annuli or rings flex together or away from each other in response to changes in internal or external pressures. A reduced internal pressure or increased external pressure causes the annuli or rings, referred to as free plates, to flex together to retract the bellows and the valve member associated therewith. Since the peripheral welds which unite the flexible thin free plates are substantially thicker than the plates themselves, such retraction causes the peripheral welds to be compressed against each other under substantial pressure each time the bellows retracts. Also, the free plates try to flex into intimate surface contact with each other in the areas adjacent the welds each time the bellows retracts. Such repeated action can result in damage to the integrity of the welds and/or cracking of the thin flexible free plates, whereby the fluid-impermeability of the bellows is lost and the bellows must be replaced.

SUMMARY OF THE INVENTION

The present invention relates to a method for producing improved flexible metal bellows devices in which at least one inner or outer spacer plate, of greater thickness than the free plates, is welded at either its outer or inner periphery between the outer or inner periphery of a pair of free plates, to form an integral spacer having a free end which extends between adjacent free plates but short of the weld which unites each of said free plates to an adjacent free plate. Thus, each said spacer plate is able to form a substantially-continuous intimate surface contact with the adjacent upper and lower free plates, thereby preventing any undesired flexing and cracking of the thin flexible free plates when the bellows is retracted, and the thickness of each said free plate is about the same as the combined thickness by which the welds on each of said free plates extend beyond the surfaces of said free plates, whereby each said free plate prevents the adjacent outer welds and/or the adjacent inner welds from undergoing strong compressive forces which can damage the integrity of the welds when the bellows is retracted.

Most preferably, this is accomplished by interposing and welding both inner and outer spacer rings, respectively, between alternate pairs of thin flexible free plates. The free plates have similar inner and outer diameters. The inner spacer rings have the same outer diameter as the free plates but a larger inner diameter. The outer spacer rings have the same inner diameter as the free plates but a smaller outer diameter. The inner periphery of each of the outer spacer plates is welded to and between the inner periphery of adjacent free plates so that the free end of each of the outer spacer plates extend outside the bellows compartment. The outer periphery of each of the inner spacer plates is welded to and between the outer periphery of alternate pairs of adjacent free plates so that the free end of each of the inner spacer plates extends inside the bellows compartment. In this manner an integral spacer plate is provided between each pair of free plates to prevent the free plates from contacting each other and to prevent or substantially reduce the compressive force between adjacent welds when the bellows is retracted.

THE DRAWING

DETAILED DESCRIPTION

Figure 1:
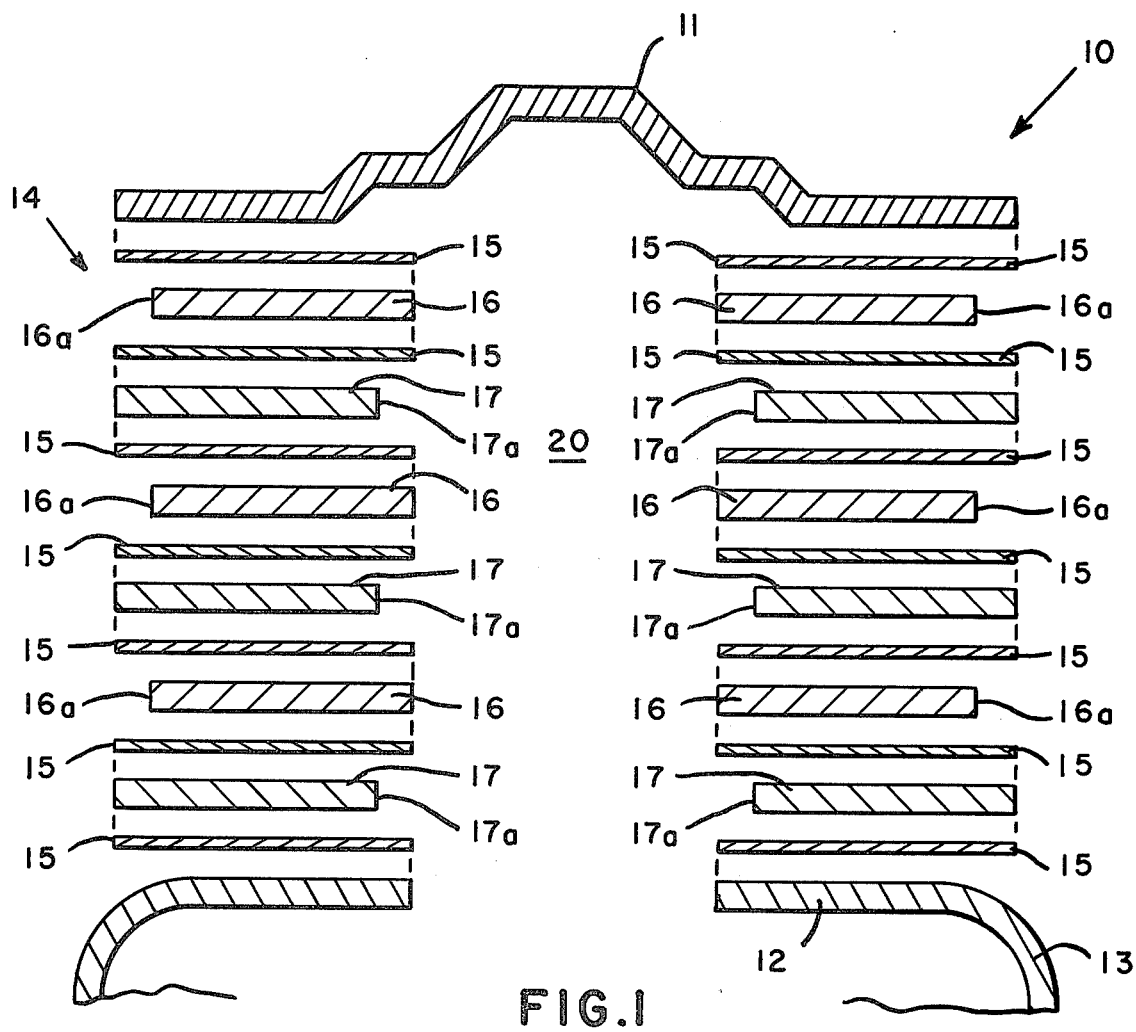
FIG. 1 is a cross-section of a stack of superposed free plates and spacer plates in proper position for welding to form a novel bellows but spaced for purposes of illustration.

Referring to the drawing, FIG. 1 illustrates a cross-sectional view of a novel bellows assembly 10 according to a preferred embodiment of the invention in which inner and outer support rings are fixed between each alternate pair of free plates. Thus the bellows assembly 10 comprises an upper end plate 11, a lower annular end plate 12 having an outer descending flange 13 which is adopted to be welded to the housing of an element such as a valve, and a bellows 14, the uppermost free plate 15 of which is welded to the upper end plate 11 at its outer periphery and the lowermost free plate 15 of which is welded to the lower end plate 12 at its inner periphery.

Figure 2:
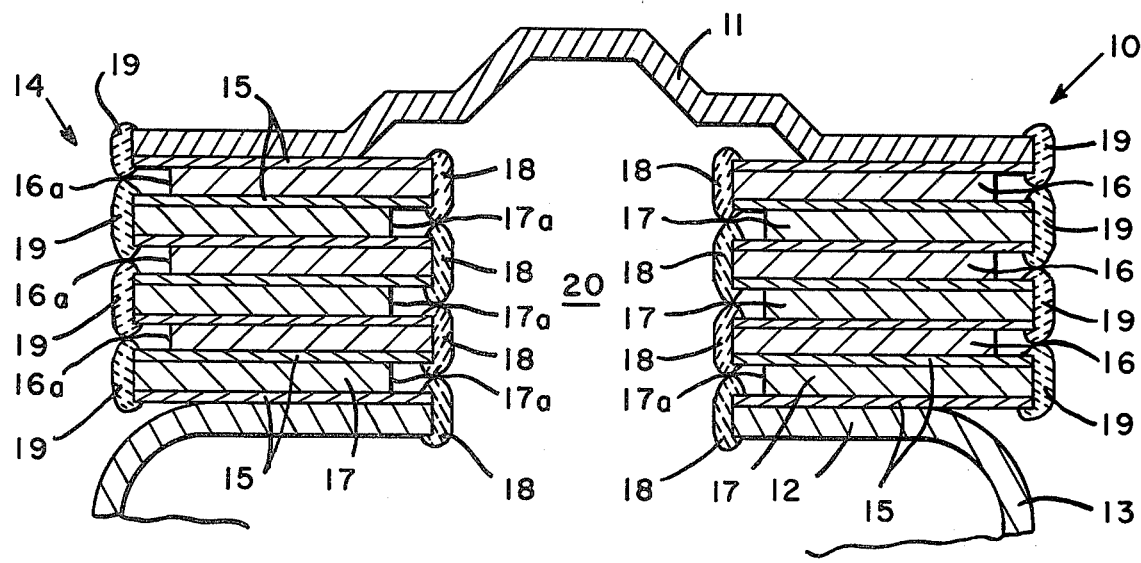
FIG. 2 is a cross-section of a welded bellows produced according to the present invention, the bellows being illustrated in retracted position.

The novel element of the heat-sensitive bellows assembly 10 of FIGS. 1 and 2 comprises the bellows 14 which consists of a plurality of thin, flexible, metallic diaphragms or free plates 15, a plurality of exterior spacer plates 16, a plurality of interior spacer plates 17 and a plurality of inner welds 18 and outer welds 19 which unite the inner and outer peripheries of alternate pairs of said free plates with a spacer plate 16 or 17 to form fluid-tight seals therebetween. Such fluid-tight seals, combined with fluid-tight weld 19 between the upper free plate 15 and the upper end plate 11 and the fluid-tight weld 18 between the lower free plate 15 and the lower end plate 12 provide a bellows assembly 10 which can have a fluid tight interior compartment and/or a fluid-tight exterior compartment. The bellows assembly 10 has an interior compartment 20 which may be open or closed to the atmosphere, and an exterior compartment which is closed to the atmosphere if the interior compartment 20 is open thereto, and which is open to the atmosphere if the inner compartment is closed thereto.

In the case of heat-sensitive bellows assemblies, a predetermined volume of a volatile liquid, such as ethanol, is injected into the compartment which is closed to the atmosphere and is retained therein against leakage. The purpose of the volatile liquid is to volatilize when the temperature within the closed compartment increases above a desired minimum level, i.e., above about 170° F. The vaporization of the liquid alcohol to a gas causes a pressure build-up within the closed compartment which, due to the lower, ambient pressure within the other compartment which is open to the atmosphere, causes the bellows assembly 10 to retract or expand to cause a fixture such as a ball valve to seat and close a bore and prevent the entry of hot air into the valve or other element. Such retraction or expansion is continued until the temperature within the valve and within the closed bellows compartment cools below the condensation temperature of the volatilized gas, whereby the gas returns to liquid form, the pressure within the closed compartment returns to about atmospheric pressure and the bellows assembly 10 opens or closes.

In a pressure-sensitive bellows assembly, the so-called closed compartment is open to the pressure within the closed system to which the bellows element, such as a valve, is connected. When the air pressure within the system increases above a predetermined desired level, such pressure extends to the interior or exterior bellows compartment open thereto to cause the bellows 14 to expand or retract in the axial direction to close the valve for so long as the excess pressure condition persists.

As shown by FIG. 1, the novel bellows 14 of the assembly 10 is formed by welding together a plurality of diaphragms or free plates 15, exterior support or spacer plates 16 and interior support or spacer plates 17, the formed bellows 14 being welded to upper end plate 11 and lower end plate 12 to attach the bellows 14 to the bellows assembly 10.

The free plates 15 are identical thin, flat, flexible metal annuli or rings each having the same outer diameter and the same inner diameter. The exterior support plates 16 and interior support plates 17 are rigid flat metal annuli or rings having identical thicknesses which are substantially greater than the thickness of the free plates 15. The exterior support plates 16 are identical and each has an inner diameter which is the same as that of the free plates 15 and an outer diameter which is slightly less than that of the free plates 15. The interior support plates 17 are identical and each has an outer diameter which is the same as that of the free plates 15 and an inner diameter which is slightly greater than that of the free plates 15. The upper end plate 11 is a flat metal disc having a diameter which is the same as the diameter of the free plates 15 and the lower end plate 12 is a flat metal ring having an inner diameter which is the same as that of the free plates 15.

The bellows assembly is formed by assembling the components in the order shown in FIG. 1 and by precision-forming the welds 18 and 19 in the areas shown by means of dotted lines in FIG. 1 while the components are pressed into intimate surface contact with each other. It will be clear to those skilled in the art that as many free plates may be used as necessary to form a bellows having the desired size and stroke, an outer or inner support plate being interposed between each welded pair of free plates to provide the novel advantages of the present invention.

FIG. 2 illustrates the welded assembly of FIG. 1, a weld 19 uniting the upper end plate 11 and the uppermost free plate 15 around the entire outer periphery of each, and a weld 18 uniting the lower end plate 12 and the bottom free plate 15 around the entire inner periphery of each. The interior welds 18 unite the inner peripheries of pairs of adjacent free plates 15 to an interposed exterior support plate 16, and the exterior welds 19 unite the outer peripheries of alternate pairs of adjacent free plates 15 to an interposed interior support plate 17. Thus, both peripheries of each free plate 15 are welded to a different adjacent free plate 15 (or to an upper or lower end plate, 11 or 12) while each of the support plates 16 and 17 is welded between a pair of free plates 15 at only one periphery so that the other periphery or end 16a and 17a of the support plates 16 and 17, respectively, is unattached and extends to a position proximate a pair of welds 18 or 19.

As shown by FIG. 2, the welds 18 and 19 are substantially uniform but are substantially thicker than the overall thickness of the plates which they unite, in order to assure the formation of fluid-tight connections. Thus, each weld overlaps each free plate 15 to form a peripheral raised bead having a thickness, beyond the exposed flat surface of each free plate 15, which is equal to up to about one-half the thickness of each support plate, 16 or 17. When the bellows 22 is retracted, as shown by FIG. 2, all of the elements thereof come into intimate surface contact, under compressive forces. However, the spacer plates 16 and 17 form flat contacting surfaces between each pair of free plates 15 which are welded to each other and provide spacers which permit the exterior welds 19 and the interior welds 18 to be spaced from each other slightly or to make casual contact when the bellows 14 is retracted. This prevents or substantially reduces the normal stress which the welds and free plates of conventional bellows assemblies undergo during retraction. In the absence of the spacer plates 16 and 17, the welds compress against each other during retraction, which can cause erosion and rupture of the fluid-tight welds. Also, in the absence of the spacer plates 16 and 17, the thickness of the projecting beads of each of the welds prevent the ends of the free plates 15, adjacent the welds, from coming into intimate surface contact with one another during retraction. This causes the ends of the free plates 15 to bend toward each other, which can result in cracking and loss of fluid-impermeability.

It will be clear to those skilled in the art that the present invention pertains to bellows assemblies of all types, provided that such assemblies are formed by the welding or soldering of a plurality of thin, flexible free plates or diaphragms to provide an accordion-like structure. Such assemblies may be pressure-sensitive or heat-sensitive and the closed, sensing compartment thereof may be external or internal.

Variations and modifications of the present invention will be apparent to those skilled in the art within the scope of the present claims.

I claim:

1. A flexible diaphragm bellows element for a bellows assembly comprising a plurality of thin, metallic, flexible annuli comprising the free plates of said bellows and forming a fluid-tight compartment in said assembly, said free plates having inner and outer peripheries which are substantially identical to each other, at least one interior or exterior spacer annulus comprising a support plate having coplanar surfaces and having an outer or inner periphery which is substantially identical to the outer or inner periphery of said free plates and having an inner or outer periphery which is substantially larger or smaller than the inner or outer periphery of said free plates, each said spacer annulus, if it is an interior support plate, being welded to and between the exterior peripheries of a pair of said free plates which are welded together at said exterior peripheries by means of a weld bead having a thickness greater than the combined thickness of the exterior peripheries of said welded free plates and spacer annulus, and each said spacer annulus, if it is an exterior support plate, being welded to and between an alternate pair of said free plates which are welded together at said interior peripheries by means of a weld bead having a thickness greater than the combined thickness of the interior peripheries of said welded free plates and spacer annulus, to provide a bellows having at least one interior or exterior support plate having one periphery welded between the exterior or interior peripheries, respectively, of a pair of said free plates and having its other periphery free of attachment and extending to a position proximate but short of the weld beads of the interior or exterior peripheries, respectively, of said free plates to adjacent free plates, each said support plate being of sufficient thickness that its free periphery spaces and proximate weld beads against strong compressive forces with each other when the bellows is retracted.

2. A flexible diaphragm bellows element according to claim 1 comprising a plurality of identical interior spacer annuli comprising support plates each having outer peripheries which are substantially identical to the outer peripheries of said free plates and having interior peripheries which are substantially larger than the inner peripheries of said free plates, one each of said interior support plates being welded to and between the exterior peripheries of each pair of said free plates which are welded together at said exterior peripheries, each of said interior support plates having its outer periphery welded between the exterior peripheries of a pair of said free plates and having its inner periphery free of attachment and extending to a position proximate but short of the welds of the interior peripheries of said free plates to adjacent free plates.

3. A flexible diaphragm bellows element according to claim 1 comprising a plurality of identical exterior spacer annuli comprising support plates each having inner peripheries which are substantially the same as the inner peripheries of said free plates and exterior peripheries which are substantially smaller than the exterior peripheries of said free plates, one each of said exterior support plates being welded to and between each pair of said free plates which are welded together at said interior peripheries, each of said exterior support plates having its inner periphery welded between the interior peripheries of a pair of said free plates and having its outer periphery free of attachment and extending to a position proximate but short of the welds of the exterior peripheries, of said free plate to adjacent free plates.

4. A flexible diaphragm bellows element according to claim 1 comprising a plurality of identical interior spacer annuli comprising support plates each having outer peripheries which are substantially identical to the outer peripheries of said free plates and having interior peripheries which are substantially larger than the inner peripheries of said free plates, a plurality of identical exterior spacer annuli comprising support plates each having inner peripheries which are substantially the same as the inner peripheries of said free plates and exterior peripheries which are substantially smaller than the exterior peripheries of said free plates, one each of said interior plates being welded to and between the exterior peripheries of each pair of said free plates which are welded together at said exterior peripheries, and one each of said exterior spacer plates being welded to and between each alternate pair of said free plates which are welded together at said interior peripheries to provide a bellows having an alternate free plate, interior support plate, free plate, exterior support plate structure, each of said support plates having one periphery, welded between the interior or exterior peripheries of a pair of said free plates and having its other periphery free of attachment and extending to a position proximate but short of the welds of the exterior or interior peripheries, respectively, of said free plates to adjacent free plates.

5. A flexible diaphragm bellows element according to claim 1, 2, 3 or 4 in which the welds at the peripheries of each of said free plates comprise raised beads which extend beyond the surface of each of said free plates by a substantially uniform thickness, and each of said interior and/or exterior support plate has a uniform thickness which is substantially equal to the combined thickness of said weld beads on the pair of free plates proximate the free, unattached periphery of each said support plate.

* * * * *